US008505576B2

(12) United States Patent
Renninger

(10) Patent No.: US 8,505,576 B2
(45) Date of Patent: Aug. 13, 2013

(54) VALVE HOUSING BLANK AND VALVE ASSEMBLY

(75) Inventor: Juergen Renninger, Langenbrettach (DE)

(73) Assignee: Buerkert Werke GmbH, Ingelfingen (DE)

( * ) Notice: Subject to any disclaimer, the term of this patent is extended or adjusted under 35 U.S.C. 154(b) by 296 days.

(21) Appl. No.: 12/908,236

(22) Filed: Oct. 20, 2010

(65) Prior Publication Data

US 2011/0089361 A1    Apr. 21, 2011

(30) Foreign Application Priority Data

Oct. 21, 2009    (DE) .................... 20 2009 014 234 U

(51) Int. Cl.
*F16K 11/20*    (2006.01)

(52) U.S. Cl.
USPC ... 137/597; 137/269; 137/68.11; 137/315.09; 251/367

(58) Field of Classification Search
USPC .................. 137/597, 269, 270, 68.11, 15.21, 137/315.09; 251/367; 29/890.127
See application file for complete search history.

(56) References Cited

U.S. PATENT DOCUMENTS

| | | | | |
|---|---|---|---|---|
| 2,399,515 A | * | 4/1946 | Snyder | 137/595 |
| 3,572,369 A | | 3/1971 | Kaufman | |
| 5,441,079 A | * | 8/1995 | Zimmerly | 137/637.2 |
| 5,896,884 A | * | 4/1999 | Hettinger | 137/269 |
| 6,123,094 A | * | 9/2000 | Breda | 137/98 |
| 6,240,941 B1 | * | 6/2001 | Small et al. | 137/1 |
| 2010/0140153 A1 | * | 6/2010 | Telepciak et al. | 210/194 |

FOREIGN PATENT DOCUMENTS

| | | |
|---|---|---|
| DE | 3422336 A1 | 12/1985 |
| DE | 4214009 C1 | 10/1993 |
| DE | 202008004672 U1 | 8/2008 |

OTHER PUBLICATIONS

Machine Translation of DE202008004672 (from translationportal.epo.org on Nov. 28, 2012).*
German Search Report dated Mar. 22, 2010.

* cited by examiner

*Primary Examiner* — John Rivell
*Assistant Examiner* — Jessica Cahill
(74) *Attorney, Agent, or Firm* — Carlson, Gaskey & Olds, PC

(57) ABSTRACT

A valve housing blank comprises a receiving space for a valve insert having a longitudinal axis. At least two first pairs of supply ducts, which are opposite to each other with respect to the longitudinal axis, extend laterally from an outer side of the blank towards the receiving space. The pairs of supply ducts, as seen in the direction of the longitudinal axis, are arranged so as to be offset relative to each other. Only one of the supply ducts is open towards the receiving space. The other supply ducts are closed off from the receiving space by a destroyable dividing wall.

24 Claims, 2 Drawing Sheets

VALVE HOUSING BLANK AND VALVE ASSEMBLY

RELATED APPLICATION

This application claims priority to German Application No. 20 2009 014 234.5, which was filed Oct. 21, 2009.

FIELD OF THE INVENTION

The invention relates to a valve housing blank and a valve assembly made up of the valve housing blanks according to the invention.

BACKGROUND

DE 20 2008 004 672 already discloses a valve housing blank which is produced in a cost-effective manner as a casting and allows high flexibility when assembling a valve assembly as it can be reworked with very little effort and then be composed to form various valve assemblies. With this valve housing blank two parallel receiving spaces for two valve inserts are coupled with ten incoming or outgoing lines in total which, in the initial state, are mainly closed off from the receiving space by thin dividing walls. Depending on the running of the lines within the valve assembly composed of several valve housings, several dividing walls are removed.

Compared with this known valve housing blank, the compatibility and the space requirement are to be further reduced so that still more compact and flexible valve assemblies can be composed from these new valve housing blanks.

SUMMARY

The valve housing blank comprises a receiving space for a valve insert having a longitudinal axis. At least two first pairs of supply ducts, which are opposite to each other with respect to the longitudinal axis, extend laterally, in particular radially, from an outer side of the blank towards the receiving space. The pairs of supply ducts, as seen in the direction of the longitudinal axis, are arranged to be offset relative to each other, with only one of the supply ducts being open towards the receiving space, and the other supply ducts being closed off from the receiving space by a dividing wall.

Other than in the prior art, the housing blank is provided with a plurality of supply ducts leading to the receiving space. In one example, at least two pairs of supply ducts, i.e. at least four supply ducts which are all offset relative to each other as seen in the direction of the longitudinal axis, are directed to be oriented towards the receiving space.

The valve housing blank can be realized in particular as a precision casting, for instance as a stainless steel precision casting.

It is preferred that only a singular, i.e. a single receiving space is provided so that the valve housing blank represents an even smaller unit than does the known valve housing blank. Nevertheless, all composable constellations exist for forming flexible valve assemblies.

In order to enhance the compactness in an axial direction, the two first pairs of supply ducts are to be in a common plane with respect to their axis. Preferably, this plane is also perpendicular to the longitudinal axis of the receiving space. Thus, it is preferred that four supply ducts extend towards the receiving space, in fact four supply ducts which are in one plane. With respect to the term "supply ducts" it is pointed out that this term is not limited to the later use of the ducts as an inflow but of course is intended to encompass all ducts which in the later use serve as fluid discharge ducts.

A further embodiment of the invention provides for several axially superimposed double pairs of supply ducts which are opposite each other with respect to the longitudinal axis and extend laterally, in particular radially, from the outer side of the blank towards the receiving space. The further double pairs of supply ducts are also offset relative to each other in the direction of the longitudinal axis. Only one of the supply ducts per double pair is open towards the receiving space, whereas the other supply ducts are closed off from the receiving space by a destroyable dividing wall.

In the following, the term "double pair" is to be understood as two pairs of supply ducts, each pair having supply ducts which are opposite each other with respect to the longitudinal axis and the two pairs being offset relative to each other in the longitudinal direction. The above-mentioned first pairs likewise form a double pair.

The other double pairs of supply ducts also should lie in a common plane with respect to their respective axis. Preferably, this plane may also extend perpendicular to the longitudinal axis so that each double pair virtually forms a plane and the planes are axially spaced from each other (axially with regard to the longitudinal axis) and are parallel to each other.

Further, the supply ducts of the different planes should be arranged in groups one behind the other in the direction of the longitudinal axis, i.e. they should not be circumferentially offset relative to each other. This means that the supply ducts of the different planes show the same orientation of the supply ducts in circumferential direction. This enhances the variability of the valve housing blanks.

For increasing variability, provision is also made that the open supply duct of the first pairs (of the first double pair) is on the diametrically opposite side with respect to the longitudinal axis, but so as to be axially offset relative to the open supply duct of the second double pair.

According to one example embodiment, the valve housing blank is a pure casting, in particular a metal or plastic injection molded part; a sintered part would be possible, too.

In order to have the wall thicknesses in the valve housing blank as low as possible and, above all, as uniform as possible, one embodiment provides that the supply ducts are formed as tubular protrusions. The valve housing blank is not a block-type part, and is instead a filigree, light-weight part which is only assembled of thin duct walls.

One or more ribs, which connect axially superimposed protrusions with each other and preferably merge integrally with the protrusions, provide enhanced stability.

These ribs may extend radially to the longitudinal axis.

Recesses, preferably in the form of holes, in the ribs represent fastening recesses through which several housing blanks can be clamped or screwed to each other.

These fastening recesses are not made by machining, but are left out when the blank is casted.

As seen in the direction of the longitudinal axis, the associated pairs of supply ducts are to be situated so as to be perpendicular to each other. This means that the axes (which are aligned anyway) of the two opposite supply ducts forming a pair in each case intersect the axes of the other pair at 90° and, in addition, in the longitudinal axis.

As the valve housing blank is not realized as a block, but as a filigree part with thin duct walls, there would be the risk during assembly and fastening of several valve housings that these cannot be clamped to each other in a stable manner. In order to improve the stability, provision is made that laterally outwards extending spacers are formed on the blanks at the sides of the supply ducts.

It is preferred that these spacers extend up to the radially outer ends of the supply ducts. This means that the spacers in combination with the supply ducts act as a supporting surface if several valve housings are assembled.

This effect can be further improved if the supply ducts in an outward direction terminate in a planar end face, and the spacers terminate in the plane of the end faces to form a contact surface.

Further, a spacer, preferably each of the spacers, extends up to the two planes of planar end faces of neighboring supply ducts (i.e. of supply ducts which are immediately adjacent in circumferential direction) and terminate there, forming a contact surface. This means that such a spacer acts in two directions, as it has two contact surfaces with different orientation.

The end faces of the supply ducts and/or the contact surfaces should be provided on the sides of a square as seen in the longitudinal direction so that the valve housing blank as seen in the longitudinal direction has an envelope in the form of a square. This facilitates assembly of several valve housings to form a valve assembly.

The spacers are in particular formed as radial ribs.

In this arrangement, the thickness of the ribs preferably is not higher than the thickness of the duct walls forming the supply ducts so that no material accumulation occurs and the process of injection molding or casting is not made difficult due to increased material accumulations.

In particular, the first pairs of supply ducts and/or the at least one other double pair have spacers of their own which preferably lie in the plane, defined by the axes of the associated supply ducts, of their double pair.

The at least one open supply duct may terminate at its outer end with a widening of its cross-section so that perhaps a sealing can be inserted, in particular one made of graphite or the like.

According to one embodiment, the receiving space terminates at an end wall which is a destroyable dividing wall, and an axial supply duct ends at the opposite side of the dividing wall. Thus, there is a supply duct in the direction of the longitudinal axis, too.

The receiving space may terminate in an outward direction in a planar flange face, and a flange face parallel thereto may also be provided on the opposite side of the blank. The flange faces, the end faces and the contact surfaces are arranged on/in the surface areas of a cube or cuboid, in particular of a cuboid with a square base area. In combination with other blanks, the blank may be assembled very easily to form a valve assembly comprising several valve inserts, concurrently with high compactness and, above all, high flexibility.

According to one embodiment, the dividing wall directly adjoins the receiving space.

With respect to the blank, at least in one duct a valve seat is produced during the casting process; this valve seat is not reworked.

The invention further relates to a valve assembly comprising several adjoining valve housings made up of valve blanks according to the invention, several dividing walls being removed at least partially to form continuous ducts and provide a flow connection between several of the supply ducts.

As an alternative to the embodiments described above, the individual valve housings, of course, may have oblique and inwardly extending receiving spaces or supply ducts extending oblique relative to each other; to give an example, even six or eight supply ducts could extend in one plane and point towards the receiving space.

BRIEF DESCRIPTION OF THE DRAWINGS

Further features and advantages of the invention will be apparent from the following description and the following drawings to which reference is made and in which.

DETAILED DESCRIPTION

Figure 1:
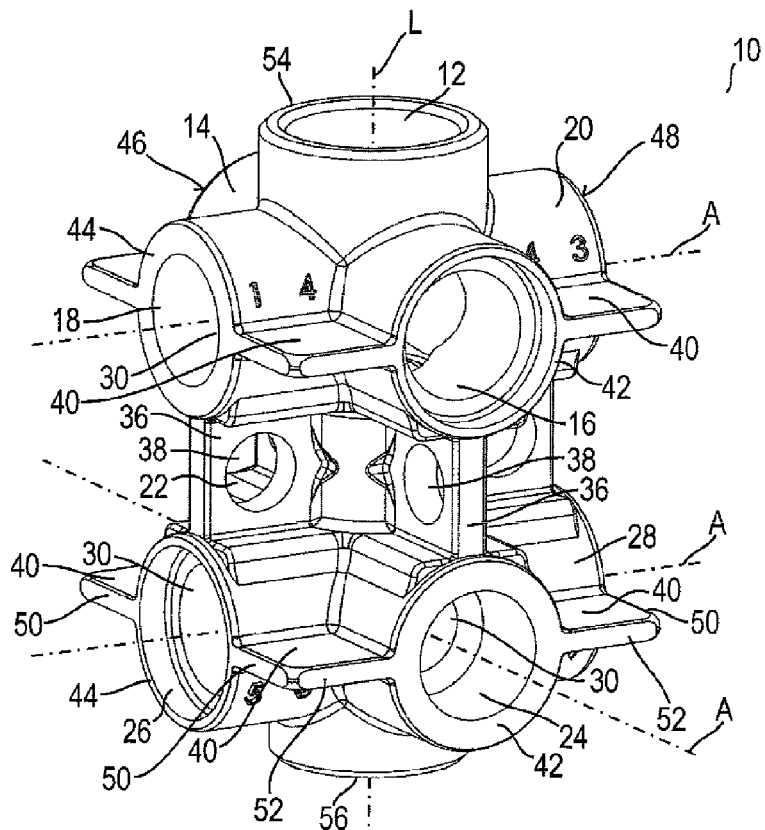
FIG. 1 is a perspective view of a first embodiment of a valve housing blank according to the invention.

FIG. 1 shows a valve housing blank 10 which is cast in one piece of plastic or metal, in particular of aluminum or stainless steel, especially by a precision casting process. The valve housing blank 10 as illustrated is not reworked by machining.

Figure 2:
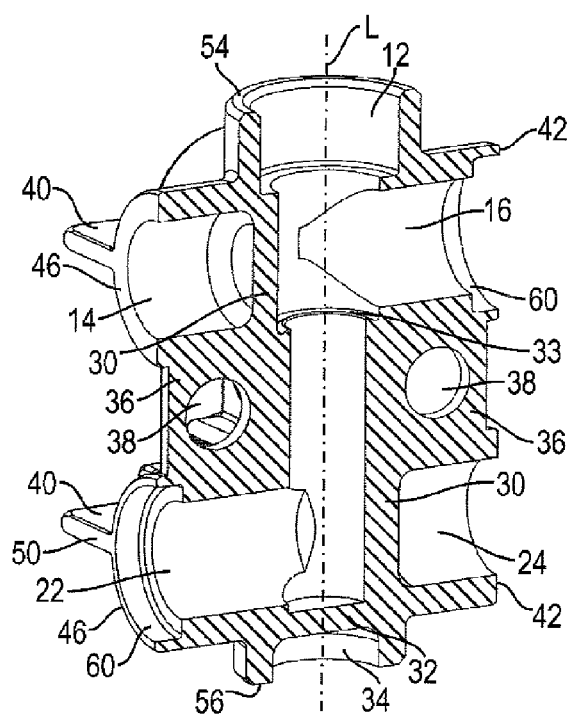
FIG. 2 is a longitudinal sectional view through the valve housing blank according to FIG. 1.

As can be easily seen in FIG. 2, the blank 10 comprises a receiving space 12 which, with increasing depth, comprises several shoulders and whose cross-section becomes increasingly narrow. The receiving space 12 has a longitudinal axis L.

Numerous supply ducts 14 extend towards the receiving space 12; here, said supply ducts 14 are disposed radially to the longitudinal axis L and are formed by thin walls with a tubular shape.

In the exemplary embodiment which is shown, an upper double pair of supply ducts 14, 16, 18, 20 and, axially offset relative thereto, a lower double pair of supply ducts 22, 24, 26, 28 extend with their axes all pointing towards the longitudinal axis L.

The upper double pair of supply ducts 14 to 20, also referred to as first pairs of supply ducts 14 to 20, includes a first pair of supply ducts 14, 16 diametrically opposite with respect to the longitudinal axis and a second pair of supply ducts 18, 20 which likewise are diametrically opposite with respect to the longitudinal axis. The axes A of both pairs extend perpendicular to the longitudinal axis L and define a plane which likewise is perpendicular to the longitudinal axis L.

The lower double pair has supply ducts 22 to 28 which are aligned in the same manner as those of the upper double pair, i.e. they have the same radial outward extension, and are arranged underneath the corresponding supply ducts 14 to 20 as seen in the direction of the longitudinal axis L supply ducts 14 to 20, i.e. are arranged without any angular offset relative to these, and which likewise define a plane with their axes A, said latter plane being perpendicular to the longitudinal axis L and hence parallel to the upper plane.

As can be taken from FIG. 2, only one supply duct 16 or 22 is open towards the receiving space 12 per each double pair of supply ducts. All other supply ducts are divided from the receiving space 12 by a thin dividing wall 30 preferably directly adjoining said space.

Depending on the flow direction system in the later valve housing and for completing the valve housing starting from the illustrated blanks, it is only required to remove those dividing walls 30 which are necessary for the fluid flow. All other dividing walls remain.

In the course of casting the valve housing blank 10, a valve seat 33 is cast on at least one supply duct (here at duct 16). The valve seat 33 is an annular shoulder realized with an in particular axially extending bead. The bead is supposed to improve tightness. The valve seat 33 is not reworked.

The machining process of the blank for forming the subsequent valve housing is minimized thereby.

In axial direction, the receiving space 12 is separated from a short, axial supply duct 34 by a dividing wall 32, said supply duct 34 extending coaxially to the receiving space 12.

In order to increase stability and for fastening valve housings to each other to form a valve assembly, in particular radially extending, integrally formed-on ribs 36 are provided, which connect the axially superimposed walls (formed as tubular protrusions) of the supply ducts 14 to 28 to each other.

The ribs 36 have a wall thickness which to the maximum corresponds to the thickness of the wall of the supply ducts 14 to 28.

As can be clearly seen in FIG. 1, the ribs 36 extend in two planes which are perpendicular to each other and in planes defined by axes A which exactly lie one above the other.

The ribs 36 have fastening recesses 38 in the form of holes. These holes have already been recessed in the casting process, i.e. no machining process is required for their manufacture.

Further, spacers 40 are formed in one piece on the valve housing blank 10.

In the preferred embodiment which is not to be understood in limiting sense, these spacers 40 are thin ribs with a wall thickness which is lower than that of the walls of the supply ducts 14 to 28.

Further, the spacers 40 preferably are arranged so as to lie in the plane of a double pair of supply ducts 14 to 20 or 22 to 28.

The spacers 40 project laterally outwards with respect to the longitudinal axis L and, according to the illustrated and preferred embodiment, extend towards the radially outer ends of the supply ducts 14 to 28, i.e. to the corresponding tube wall as will be explained in more detail below.

The tube walls of the supply ducts 14 to 28 each terminate in particular in a planar end face 42, 44, 46, 48. For paired, axially superimposed supply ducts 14 to 28, these end faces 42 to 48 form four planes E1 to E4 in total (see FIG. 3) forming paired parallel planes, with the planes E1, E2 of one pair being perpendicular to the planes E3, E4 of the other pair.

The spacers 40 extend up to these planes E1 to E4 defined by the end faces 40 to 48; preferably, each of the spacers 40 extends up to two planes E1 to E4 which meet so as to be perpendicular to each other and, so to speak, is formed as a corner rib.

The spacers 40 have planar contact surfaces 50, 52 terminating in the above-mentioned planes E1 to E4 defined by the end faces 42 to 48.

As can be seen in FIG. 1, each double pair of supply ducts 14 to 20 and 22 to 28 has spacers 40 of its own, for the illustrated embodiment four spacers 40 which at the same time serve as connecting ribs between neighboring walls of the supply ducts 14 to 28.

Figure 3:
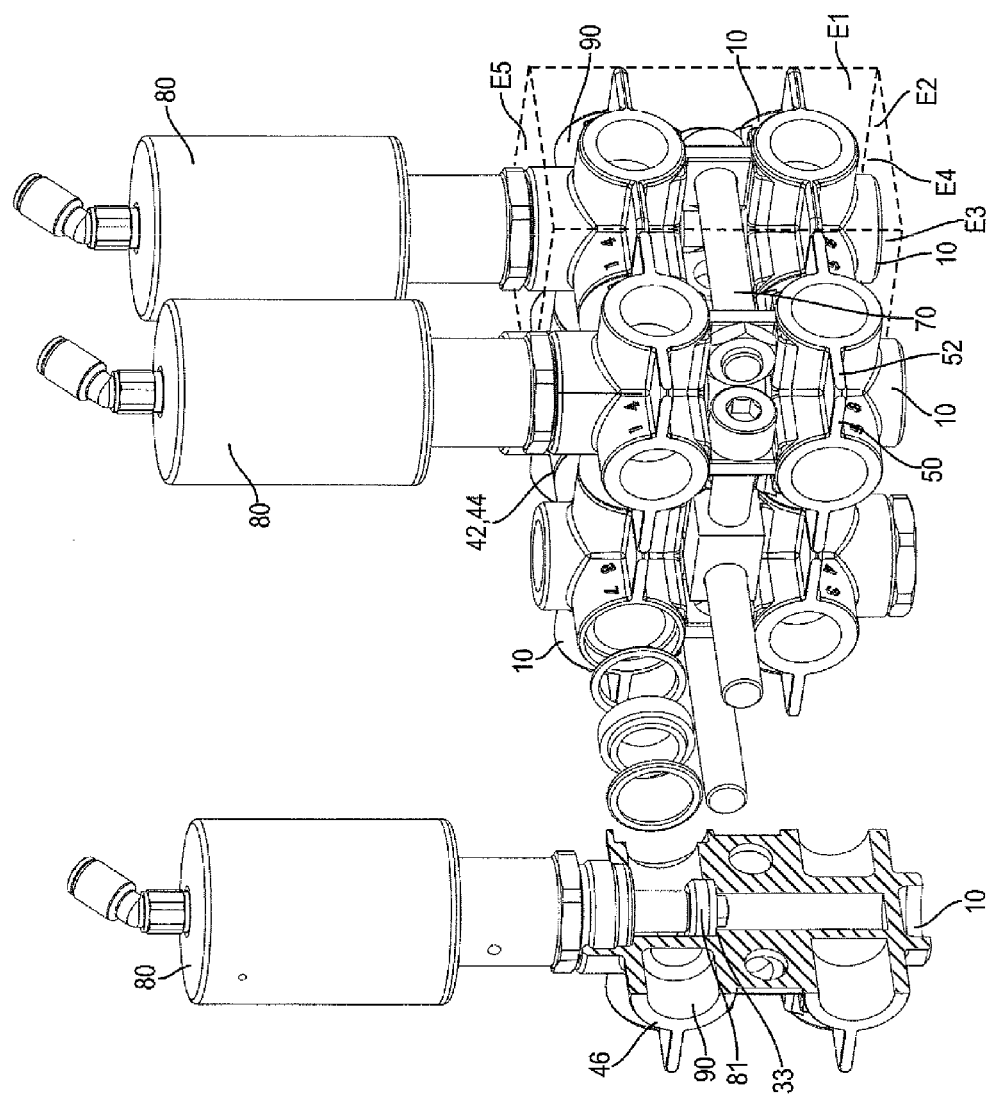
FIG. 3 shows a valve assembly comprising several valve housings coupled to each other which are formed of valve housing blanks according to the invention, partially in an exploded and sectional view.

As seen in the top view, i.e. in the direction of the longitudinal axis L, all end faces 42 to 48 as well as the contact surfaces 50, 52 are provided on the side surface areas of a square (see FIG. 3).

The planar flange faces 54, 56, extending perpendicular to the longitudinal axis L, in combination with the end faces 42 to 48 and the contact surfaces 50, 52, result in a cuboid covering, in particular with a square base area (see FIG. 3).

As an alternative embodiment to the embodiment which is illustrated, valve housing blanks may also be provided which are halved in the axial direction relative to FIG. 1, and only have one double pair of supply ducts.

In FIG. 2, it also can be seen that the two supply ducts 16, 22 lying in the two superimposed planes and being innately open towards the receiving space 12 are disposed on diagonally opposite sides of the longitudinal axis L as seen in the longitudinal direction and, are only axially offset relative to each other. At the radial outer end, these supply ducts 16, 22 terminate with a widened cross-section 60 which is realized in a step-like manner and is already formed during the injection molding process. In this widening 60, a sealing or a connecting tube can be received, for example.

FIG. 3 shows that several valve housings manufactured from the valve housing blanks 10 according to FIGS. 1 and 2 may be composed in a very simple and modular manner to form any valve assembly (also referred to as valve block). The connecting process is preferably performed via clamping elements, in particular threaded rods 70 extending through the recesses 38 in the ribs 36 and fastening neighboring valve housings to each other.

Some of the dividing walls 30 or 32 are removed in order to provide corresponding line running.

It can also be taken from FIG. 3 that some of the receiving spaces 12 are provided with, for instance, pneumatically operable actuators comprising corresponding valve inserts 80 which protrude into the receiving spaces 12 and, after actuation, connect opposing or offset supply ducts 14 to 28 to each other or isolate these in order to allow for different flow runs. Valve bodies 81 may be pressed against a valve seat for closing a duct.

In FIG. 3, it is to be seen that not each of the valve housings is provided for receiving a valve insert 80; rather, there are valve housings which merely serve for line running. Possibly, a receiving space 12 may be closed by a plug in the region of its free end, if this is necessary.

Due to the cuboid shape, any valve assemblies may be composed, which also may be quite complex. The basic construction is unchanged, however. This means that it is possible to produce extremely complex valve assemblies with one type of valve housing blanks, together with the need for very little machining effort.

In order to make the various supply ducts 14 to 28 identifiable, each supply duct 14 to 28 has an individual shape or labeling, here in the form of numbers 90. Apart from actuators, it is also possible, of course, to install other valve inserts 80 in the valve housing, for instance check valves, filters or pressure reducers.

As can be seen in FIG. 3, the adjoining valve housings are in contact with the end faces 42 to 48 and, in addition, with the contact surfaces 50, 52 so that despite being clamped by the connectors, in this case the threaded rods 70, a tilting movement of the individual valve housings is not possible; rather, they rest against each other in stable manner so as to be safeguarded against tilting.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve housing blank, comprising:
   a receiving space for a valve insert having a longitudinal axis;
   at least two first pairs of supply ducts which are opposite to each other with respect to the longitudinal axis and extend laterally in a radial direction from an outer side of the valve housing blank towards the receiving space;
   the at least two first pairs of supply ducts, as seen in the direction of the longitudinal axis, being arranged offset relative to each other;

wherein only one supply duct is open towards the receiving space, the other ducts being closed off from the receiving space by a destroyable dividing wall;
laterally outward extending spacers formed on sides of the supply ducts;
wherein supply ducts in an outward direction terminate in a planar end face and the spacers terminate in a plane of the end faces to form a contact surface; and
wherein each spacer extends up to two planes defined by end faces and terminates at the end face to form one contact surface each.

2. A valve assembly comprising:
several adjoining valve housings made up of valve housing blanks that each comprise
a receiving space for a valve insert having a longitudinal axis,
at least two first pairs of supply ducts which are opposite to each other with respect to the longitudinal axis and extend laterally in a radial direction from an outer side of the valve housing blank towards the receiving space,
the at least two first pairs of supply ducts, as seen in the direction of the longitudinal axis, being arranged offset relative to each other, and
wherein only one supply duct is open towards the receiving space, the other supply ducts are each closed off from the receiving space by a destroyable dividing wall; and
the destroyable dividing walls are at least partially removable to form continuous ducts and to provide a flow connection between several of the supply ducts.

3. A valve housing blank, comprising:
a receiving space for a valve insert having a longitudinal axis;
at least two first pairs of supply ducts which are opposite to each other with respect to the longitudinal axis and extend laterally in a radial direction from an outer side of the valve housing blank towards the receiving space;
at least one further double pair of supply ducts which are opposite each other with respect to the longitudinal axis and extend laterally in a radial direction from the outer side of the blank towards the receiving space;
the at least two first pairs of supply ducts and the at least one further double pair of supply ducts as seen in the direction of the longitudinal axis, being arranged offset relative to each other; and
wherein only one supply duct per each double pair is open towards the receiving space, the other supply ducts being closed off from the receiving space by a destroyable dividing wall.

4. The valve housing blank according to claim 3, wherein the two first pairs of supply ducts, with respect to a respective duct axis, are situated in a plane that is perpendicular to the longitudinal axis.

5. The valve housing blank according to claim 3, wherein the further double pair of supply ducts, with respect to a respective duct axis, also lies in a plane that is perpendicular to the longitudinal axis.

6. The valve housing blank according to claim 3, wherein the two first pairs of supply ducts and the at least one further double pair of supply ducts comprise axially superimposed supply ducts.

7. The valve housing blank according to claim 3, wherein an open supply duct of the first pairs of supply ducts, with respect to the longitudinal axis, is provided on a diametrically opposite side, but axially offset relative to an open supply duct of the further double pair of supply ducts.

8. The valve housing blank according to claim 3, wherein associated pairs of supply ducts are perpendicular to each other.

9. The valve housing blank according to claim 3, wherein the first pairs and/or the at least one further double pair of supply ducts each have spacers that lie in a plane defined by axes of the associated supply ducts.

10. The valve housing blank according to claim 3, wherein at least one open supply duct terminates at an outer end with a widening of its cross-section.

11. The valve housing blank according to claim 3, wherein the receiving space terminates in a front-side wall which is a destroyable dividing wall, with an axial supply duct terminating at an opposite side of the dividing wall.

12. The valve housing blank according to claim 3, wherein the receiving space terminates in an outward direction in a planar flange face, another parallel flange face being provided at an opposite side of the blank, and with the flange faces, the end faces, and the contact surfaces being arranged in surface areas of a cuboid with a square base area.

13. The valve housing blank according to claim 3, wherein the dividing wall directly adjoins the receiving space.

14. The valve housing blank according to claim 3, wherein the valve housing blank is formed as a stainless steel precision casting.

15. The valve housing blank according to claim 3, wherein a valve seat produced by casting is formed in a supply duct.

16. The valve housing blank according to claim 3, wherein the supply ducts are realized as tubular protrusions.

17. The valve housing blank according to claim 16, wherein axially superimposed protrusions are connected to each other by an integrally formed rib.

18. The valve housing blank according to claim 17, wherein the ribs extend radially with respect to the longitudinal axis.

19. The valve housing blank according to claim 17, wherein a fastening recess is cast in the ribs.

20. The valve housing blank according to claim 3, including laterally outward extending spacers formed on sides of the supply ducts.

21. The valve housing blank according to claim 20, wherein the spacers extend up to a radially outer ends of the supply ducts.

22. The valve housing blank according to claim 20, wherein the spacers are formed as radial ribs that are situated in a plane perpendicular to the longitudinal axis.

23. The valve housing blank according to claim 20, wherein supply ducts in an outward direction terminate in a planar end face and the spacers terminate in a plane of the end faces to form a contact surface.

24. The valve housing blank according to claim 23, wherein the end faces of the supply ducts and/or the contact surfaces are provided on sides of a square as seen in the longitudinal direction.

* * * * *